United States Patent [19]
Chaney et al.

[11] Patent Number: 5,461,837
[45] Date of Patent: Oct. 31, 1995

[54] WINDOW MEETING RAIL

[75] Inventors: Michael T. Chaney, Middletown; Philip G. Morton, Germantown, both of Ohio

[73] Assignee: Aluminum Company of America, Pittsburgh, Pa.

[21] Appl. No.: 174,847

[22] Filed: Dec. 29, 1993

[51] Int. Cl.[6] .................................................. E06B 1/04
[52] U.S. Cl. ........................... 52/204.68; 52/204.57; 403/260; 403/264; 403/297
[58] Field of Search .................... 52/204.5, 204.62, 52/204.55, 204.53, 204.57, 204.58, 204.64, 204.65, 204.68, 207, 721; 49/176; 403/245, 246, 260, 264, 297

[56] References Cited

U.S. PATENT DOCUMENTS

| | | | |
|---|---|---|---|
| 3,850,534 | 11/1974 | O'Halloran | 403/264 X |
| 3,990,196 | 11/1976 | Eddins | 52/204.62 X |
| 4,013,371 | 3/1977 | Nagase | 403/260 X |
| 5,203,135 | 4/1993 | Bastian | 403/297 X |

FOREIGN PATENT DOCUMENTS 2484009  12/1981  France ........................... 52/204.5

Primary Examiner—Carl D. Friedman
Assistant Examiner—Creighton Smith
Attorney, Agent, or Firm—Glenn E. Klepac

[57] ABSTRACT

A window meeting rail for single hung windows made from hollow plastic parts. The meeting rail comprises an elongated body, a clip inserted into an opening in the body and fastener means for joining the clip to a window jamb. The clip defines a bore and has wings spaced radially outward from the bore and extending generally parallel thereto. A preferred meeting rail has a hollow body and also includes a metal cross rail inserted into the hollow body for added strength and rigidity. Tightening a screw inserted into the bore spreads the wings outward so that hooks on end portions of the clip wings are wedged into slots formed in lateral walls of the cross rail.

22 Claims, 4 Drawing Sheets

WINDOW MEETING RAIL

PENDING RELATED APPLICATIONS

This application is related to copending Chaney et al U.S. Design patent application Ser. No. 29/016,487, filed Dec. 16, 1993, for a Window Rail Clip.

1. Field of the Invention

The present invention relates to a meeting rail for use in a single hung window having a hollow plastic frame.

2. Background of the Invention

Single hung windows having extruded hollow plastic frames are known in the prior art. The frames of these windows traditionally include a pair of elongated jambs joined to a head, a rail and a sill. A meeting rail is added about halfway between the head and the sill to improve the frame's rigidity and to provide an appearance similar to that of a double hung window.

One of the problems associated with the manufacture and assembly of such windows is the difficulty of matching the shape of the meeting rail to the shapes of adjacent parts. When the meeting rail includes a hollow body extruded from plastic, it is generally not possible to fit ends of the meeting rail directly into narrow channels in the window jambs. Consequently, the meeting rail ends have generally been machined to a desired shape after extrusion so that the ends will fit into narrow channels in the jambs. However, this machining operation is labor-intensive and difficult to perform correctly because there is little margin for error. The manufacturing process is complicated even further when it is desired to reinforce the body with a metal cross rail to provide additional strength and rigidity.

It is a principal objective of the present invention to provide a meeting rail having a novel clip for joining the meeting rail to a window jamb.

A related objective of the invention is to provide a meeting rail comprising an extruded body, a metal cross rail, and a novel clip for joining the meeting rail to a window jamb, all combined into a unitary structure.

An important advantage of the present invention is that the body of the meeting rail is cut to size by a simple right angle saw cut, thereby avoiding the labor-intensive machining operation described above.

Additional objectives and advantages of our invention will become readily apparent to persons skilled in the art from the following detailed description.

SUMMARY OF THE INVENTION

The meeting rail of the invention is intended for use as a component part of a window having a frame made from hollow, rigid plastic extrusions. The principal component of such extrusions is generally polyvinyl chloride together with various organic and inorganic additives. Such windows are commonly called "vinyl windows" because they usually contain polyvinyl chloride. The frame comprises a pair of jambs and a head, a sill and a meeting rail all joined to the jambs.

The jambs each define a narrow channel having an end wall and two side walls extending laterally inwardly from the end wall. As used herein, the term "laterally inwardly" refers to a direction toward the center of the window, in the plane of the window.

The meeting rail comprises an elongated body defining a longitudinally extending opening and a clip for joining the meeting rail to the window frame. The body is preferably hollow and extruded from a plastic material and the clip is preferably solid and molded from plastic material. A particularly preferred clip is injection molded from nylon.

The plastic clip includes a principal portion having an outer contour sized for insertion into the meeting rail opening. The principal portion also defines a longitudinally extending bore for receiving a screw, and at least two wings extending radially outward from the bore. A screw inserted into the bore spreads the wings radially outward from the principal portion of the clip when the screw is tightened.

In a preferred embodiment of the meeting rail, a metal cross rail is inserted into the opening in the hollow body. The cross rail is preferably an aluminum alloy extrusion. The cross rail defines an aperture having an interior wall.

In a preferred embodiment, the interior wall of the cross rail defines a pair of opposed slots. Two wings on the clip each have a hook sized for insertion into a slot. When the hooks are pressed into the slots, the clip is locked into engagement with the cross rail.

When the clip is inserted into the aperture in the cross rail, tightening the screw spreads the clip wings radially outward from the principal portion so that the hooks engage the slots in the cross rail, thereby preventing removal of the cross rail from the opening in the hollow body. In a preferred embodiment, opposed first and second clips are inserted spaced ends of the cross rail.

An attachment means is also provided for attaching the meeting rail clip to the jambs. A preferred attachment means comprises an upper leg extending upwardly from a principal portion of the clip and a lower leg extending downwardly from the principal portion. Both legs are sized for insertion into the channels in the jambs. The legs may be inserted into punched slots in the jambs or they may be attached to the jambs by screw fasteners or other preferred fastening means.

In a preferred embodiment, each of the legs define a screw hole for receiving a screw fastener. The clips are joined to the jambs by passing a screw fastener through each screw hole into an end wall of the window jamb channel.

DETAILED DESCRIPTION OF THE PREFERRED EMBODIMENTS

Figure 1:
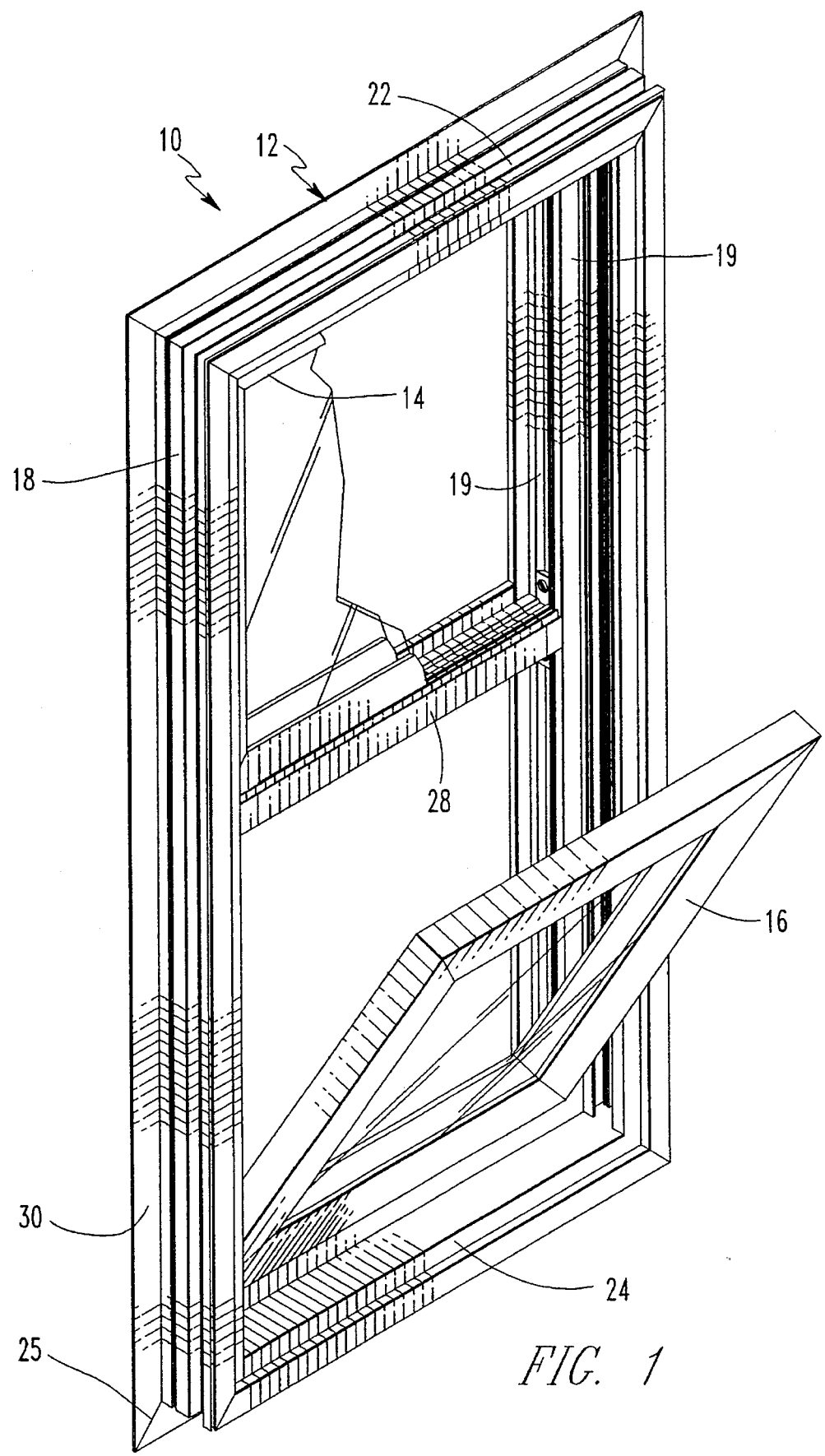
FIG. 1 is a perspective view of a window assembly made in accordance with the present invention.

There is shown in FIG. 1 a single hung window made in accordance with the present invention. The window 10 includes a generally rectangular frame 12 supporting a fixed upper sash 14 and a movable lower sash 16. The frame 12 and sashes 14, 16 are all constructed from a rigid plastic material such as a polymer compound containing polyvinyl chloride along with various organic and inorganic additives.

The frame 12 includes two vertically extending jambs or jamb members 18, 19 connected together by a horizontally extending head or header 22 and a horizontally extending sill 24 at mitered corner joints 25 which are bonded together preferably by fusion welding or other heating means. A meeting rail 28 extends between the two jambs 18, 19 about midway between the head 22 and sill 24. A nailing flange or nailing strip 30 extends around an outer perimeter of the frame 12.

In the prior art, the meeting rail 28 has been joined to the jambs 18, 19 by passing screw fasteners through the jambs 18, 19 into lateral ends of the rail 28. However, this prior art construction technique does not allow for temporary enlargement of the window opening by removal of the meeting rail. Accordingly, there exists a need for a means of joining the meeting rail 28 to the jambs 18, 19 wherein the meeting rail 28 may be removed and later rejoined, all without detaching the window frame 12 from wood studs in a surrounding building support structure (not shown).

Figure 2:
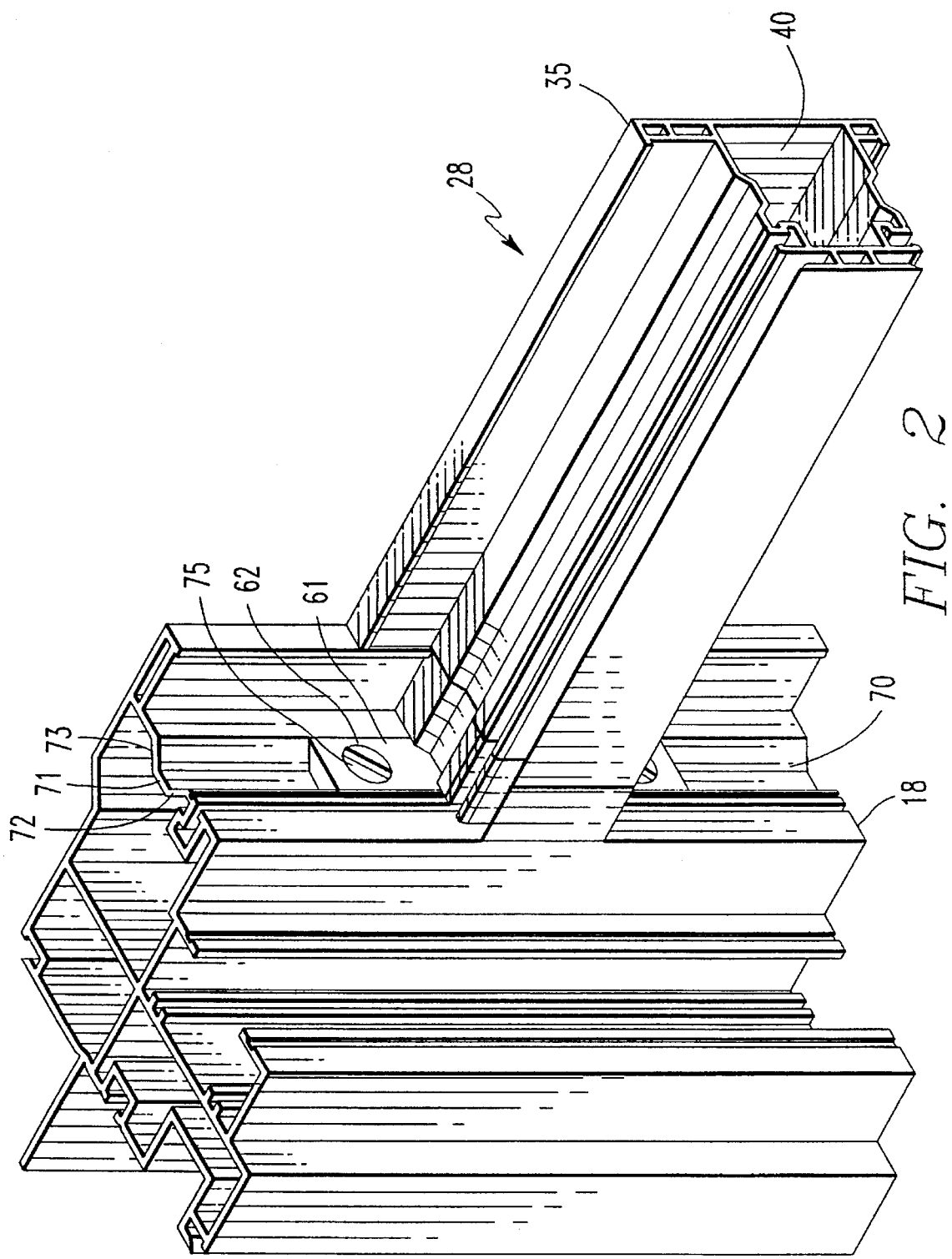
FIG. 2 is an enlarged, fragmentary perspective view of the window assembly of FIG. 1.
Figure 3:
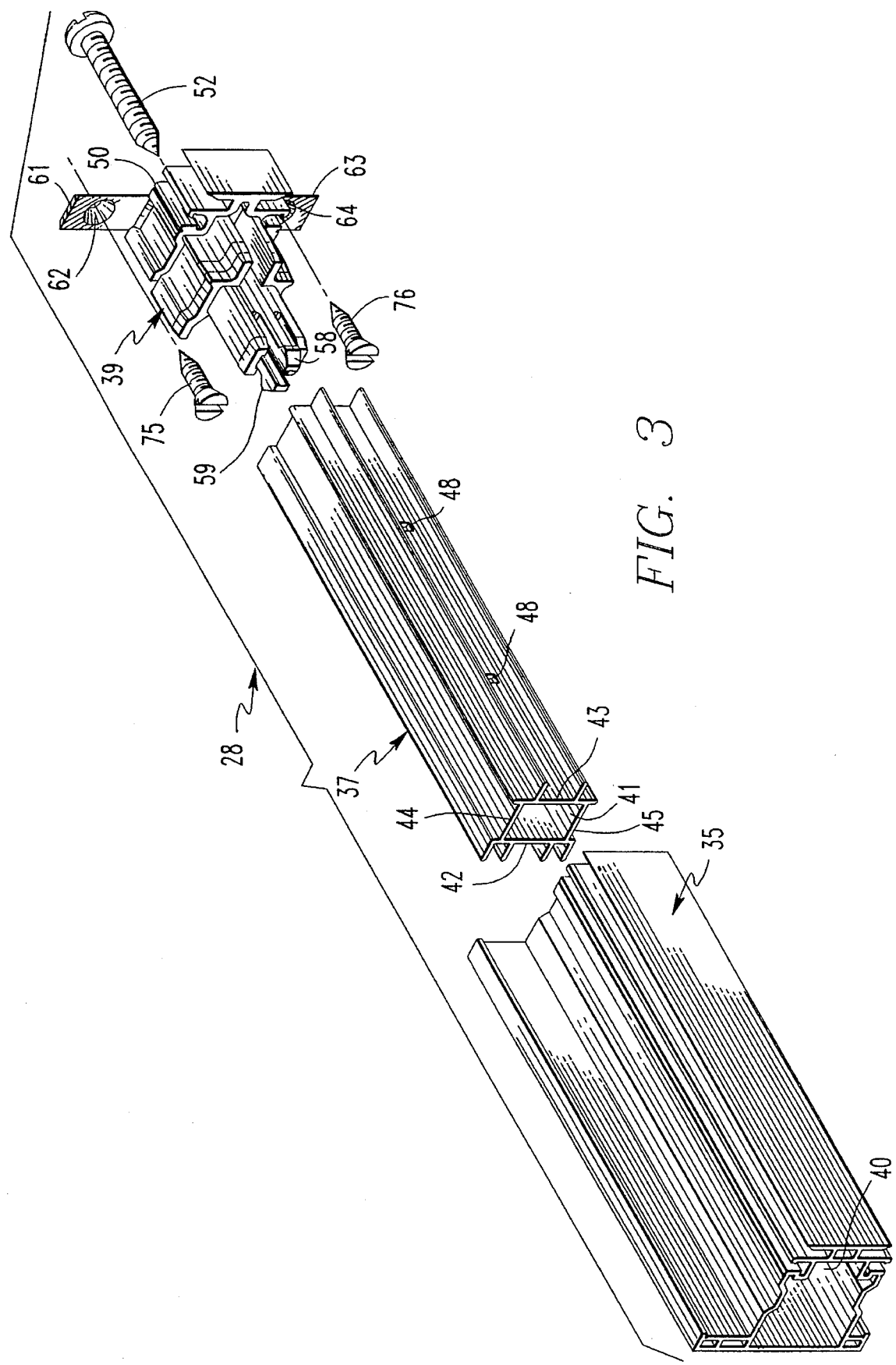
FIG. 3 is an exploded perspective view of a meeting rail of the invention.

Referring now to FIGS. 2 and 3, there is shown a preferred meeting rail 28 of the invention. The meeting rail 28 comprises an elongated hollow plastic body 35, a metal cross rail or reinforcement 37 and a plastic clip 39. The body 35 is a rigid plastic extrusion defining an elongated opening 40. The metal cross rail 37 is inserted into the opening 40. The cross rail 37 defines an elongated aperture 41 having laterally extending lateral walls 42, 43 joined to a top wall 44 and bottom wall 45. The body opening 40 and cross rail aperture 41 are generally parallel, as shown in FIG. 3. The lateral walls 42, 43 each define small slots 48 near opposed ends of the cross rail 37.

Figure 5:
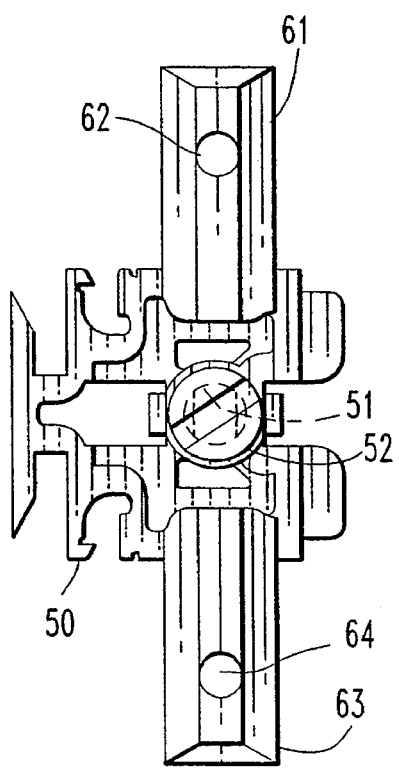
FIG. 5 is a side elevational view of the meeting rail clip taken on line 5—5 of FIG. 4.
Figure 4:
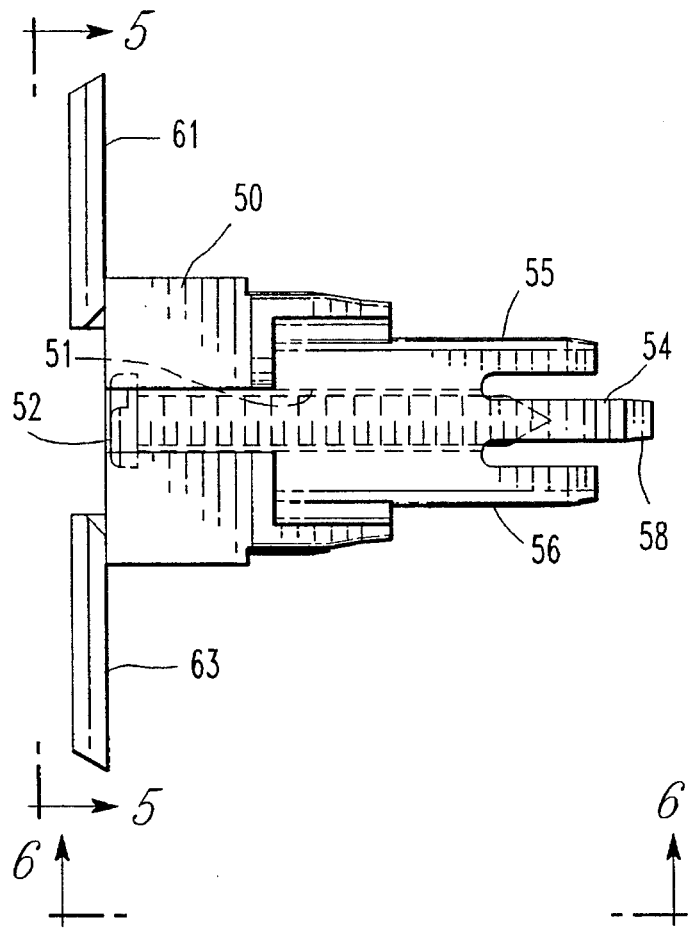
FIG. 4 is a front elevational view of the meeting rail clip of our invention.
Figure 6:
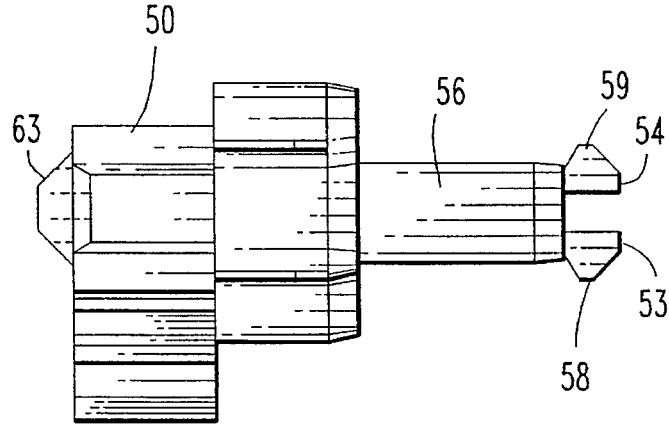
FIG. 6 is a bottom view of the meeting rail clip taken on line 6—6 of FIG. 4.

The plastic clip 39 is injection molded from a rigid plastic material, preferably a polymer compound containing nylon. As shown in FIGS. 4, 5 and 6, the clip 39 includes a principal portion or body member 50 defining an elongated, axially extending through bore 51 for receiving a metal screw 52. Four wings 53, 54, 55, 56 extend generally parallel to the bore 51 and screw 52. These wings 53, 54, 55, 56 are attached to the principal portion 50 adjacent to the bore 51. Two wings 53, 54 have free ends spaced from the principal portion 50 and terminating in hooks 58, 59 directed radially outward from the bore 51.

The clip 39 also includes attachment means for joining the meeting rail 28 to the window jambs 18, 19. The attachment means comprises an upper leg 61 defining a screw hole 62 and a lower leg 63 defining a screw hole 64. Both legs 61, 63 have a wedge shape corresponding to the shape of channels in the window jambs 18, 19.

Assembly of the meeting rail 28 is described herein with reference to FIG. 3. Initially, the cross rail 37 is inserted endwise into the opening 40 in the body 35. Next, the clip 39 is inserted into an end aperture 41 in the cross rail 37 until hooks 58, 59 become locked into slots 48 in the lateral walls 42, 43. Finally, the metal screw 52 is inserted into the bore 51 in principal portion 50 of the clip 39.

Figure 7:
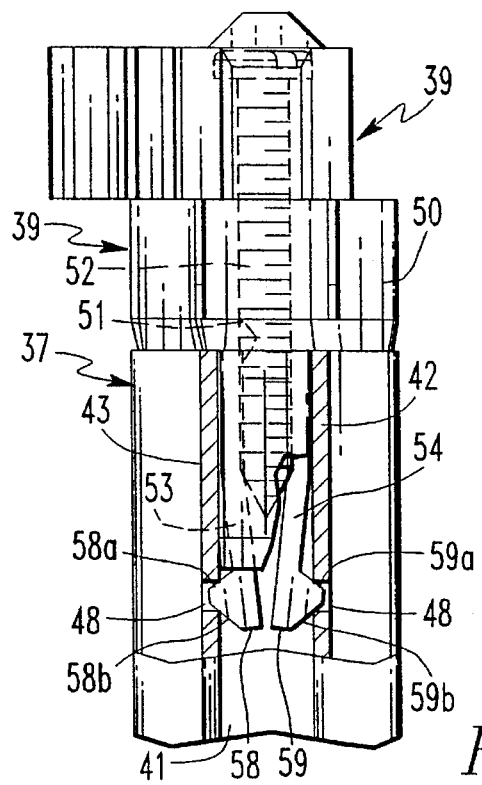
FIG. 7 is a fragmentary cross-sectional view showing two hooks of a meeting rail clip inserted into slots in a cross rail.

As shown in FIG. 7, when the clip 39 is inserted into the aperture 41, the hooks 58, 59 on the wings 53, 54 engage slots 48 in the lateral walls 42, 43. Tightening the screw 52 enlarges the bore 51, thereby forcing the wings 53, 54 and their hooks 58, 59 radially outward. Angled portions 58a, 58b, 59a, 59b of the hooks 58, 59 engage edge parts of the lateral walls 42, 43 adjacent the slots 48. When engaged in the position shown in FIG. 7, the clip 39 is very resistant to being dislodged from the aperture 41 in the cross rail 37.

The meeting rail 28 is joined to a window jamb 18 as shown in the particularly preferred embodiment of FIGS. 2 and 3. The jamb 18 defines an elongated, vertically extending channel 70 having an end wall 71 joined to side walls 72, 73 extending laterally inward from the end wall 71. Legs 61, 63 of the clip 39 are inserted into the channel 70. Finally, screws 75, 76 are inserted through screw openings 62, 64 in the legs 61, 63 and the end wall 72 of the channel 70. The meeting rail 28 is thereby firmly joined to the jamb 18, but can be removed when desired simply by extracting the two screws 75, 76 from the legs 61, 63.

The foregoing detailed description of our invention has been made with reference to some preferred embodiments. Persons skilled in the art will understand that numerous changes and modifications can be made therein without departing from the spirit and scope of the following claims:

What is claimed is:

1. A meeting rail for use in a window having a frame comprising a pair of jambs and a head, a sill and a meeting rail each joined to said jambs, said meeting rail comprising:
   (a) an elongated body defining a longitudinally extending opening; and
   (b) a clip for joining said meeting rail to said frame, said clip comprising:
      (i) a principal portion sized for insertion into said opening; and
      (ii) attachment means for attaching said clip to a jamb in a window frame; and
   (c) a cross rail sized for insertion into said opening and defining an aperture having an interior wall, said principal portion of the clip being sized for insertion into said aperture.

2. The meeting rail of claim 1 wherein said principal portion of the clip defines a bore for receiving a screw and said clip further comprises:
   (iii) at least two wings spaced radially outward of said bore, and
   (iv) a screw sized for insertion into said bore, whereby tightening said screw in said bore expands said wings radially outward.

3. The meeting rail of claim 2 wherein said interior wall of the cross rail defines at least one slot and at least one of said wings includes a hook for insertion into said slot, whereby engaging said hook into said slot wedges said clip into the cross rail.

4. The meeting rail of claim 2 wherein said interior wall of the cross rail defines a pair of opposed slots and said clip further comprises a pair of wings each including a hook for insertion into a slot, whereby engaging said hooks into said slots locks said clip into the cross rail.

5. The meeting rail of claim 1 wherein at least one of said jambs defines a channel and said attachment means comprises at least one leg extending outward of said principal portion, said leg being sized for insertion into said channel.

6. The meeting rail of claim 1 wherein said attachment means comprises an upper leg extending upwardly from said principal portion and a lower leg extending downwardly from said principal portion, said legs each defining a hole for receiving a fastener suitable for joining said clip to an end wall of a channel in a window jamb.

7. The meeting rail of claim 6 wherein said attachment means further comprises two fasteners for fastening said legs to said end wall.

8. The meeting rail of claim 6 wherein said legs are both narrower than said channel.

9. The meeting rail of claim 1 wherein said body of the meeting rail is extruded from a plastic material and said clip is molded from a plastic material.

10. The meeting rail of claim 2 wherein said cross rail comprises an aluminum alloy extrusion.

11. A window including a frame for supporting a light transmitting window pane, said frame comprising a head, a sill spaced from said head, a pair of elongated jambs connecting said head and said sill, and a meeting rail extending between said jambs intermediate said head and said sill, said meeting rail comprising:

(a) a hollow body defining a longitudinally extending through opening; and (b) a clip for joining said hollow body to said frame, said clip comprising:

(i) a principal portion inserted in said through opening and defining a bore for receiving a screw, said principal portion including at least two wings spaced radially outward of said bore and extending generally parallel thereto;

(ii) a screw inserted in said bore, whereby tightening said screw in said bore spreads said wings radially outwardly from said principal portion; and (iii) attachment means for attaching said clip to a jamb in said frame.

12. The window of claim 11 further comprising:

(c) a hollow cross rail inserted in said through opening and defining an aperture having an interior wall defining a pair of opposed slots, said principal portion including a pair of wings having hooks inserted into said slots.

13. The window of claim 11 further comprising:

(c) a hollow cross rail inserted in said through opening and having an interior wall defining a pair of opposed through slots, said wings each having a hook including angled portions engaging said interior wall adjacent said slots, thereby wedging said clip into said cross rail.

14. The window of claim 13 wherein said through opening in the body, said bore in the clip and said aperture in the cross rail are generally parallel to each other.

15. The window of claim 11 wherein said fastener means comprises an upper leg extending upwardly from said principal portion and a lower leg extending downwardly from said principal portion, said legs each defining a laterally extending through hole, and a fastener extending through each said hole into an end wall of a channel in the jambs.

16. The window of claim 11 wherein said head, sill, jamb and meeting rail are each extruded from plastic material.

17. The window of claim 11 wherein said clip is molded from plastic material.

18. The window of claim 12 wherein said cross rail comprises a metal extrusion.

19. The window of claim 11 comprising first and second clips joining opposed ends of said hollow body to opposed jambs in said frame.

20. A meeting rail for use in a window having a frame comprising a pair of jambs and a head, a sill and a meeting rail each joined to said jambs, said meeting rail comprising:

(a) an elongated body defining a longitudinally extending opening; and (b) a clip for joining said meeting rail to said frame, said clip comprising:

(i) a principal portion sized for insertion into said opening; and (ii) attachment means for attaching said clip to a jamb in a window frame and comprising an upper leg extending upwardly from said principal protion and a lower leg extending downwardly from said principal portion, said upper leg and said lower leg each defining a hole for receiving a fastener suitable for joining said clip to an end wall of a channel in a window jamb.

21. The meeting rail of claim 20 wherein said attachment means further comprises two fasteners for fastening said legs to said end wall.

22. The meeting rail of claim 20 wherein said legs are both narrower than said channel.

* * * * *